United States Patent [19]
McIndoo et al.

[11] 3,754,615
[45] Aug. 28, 1973

[54] VEHICLE FRAME STRUCTURE

[75] Inventors: Robert G. McIndoo, Aurora; Peter Sidles, Jr., North Aurora, both of Ill.

[73] Assignee: Caterpillar Tractor Co., Peoria, Ill.

[22] Filed: June 14, 1971

[21] Appl. No.: 152,513

[52] U.S. Cl. .................................. 180/69.1, 180/51
[51] Int. Cl. ............................................ B62d 25/20
[58] Field of Search .......................... 180/69.1, 51

[56] References Cited
UNITED STATES PATENTS

| 3,396,810 | 8/1968 | Andrews | 180/69.1 |
| 3,437,163 | 4/1969 | Lemmerman | 180/51 |
| 3,556,238 | 1/1971 | Figura | 180/51 |
| 971,550 | 10/1910 | Mullins | 180/69.1 |
| 925,783 | 6/1909 | Miller | 180/69.1 |
| 3,651,884 | 3/1972 | Dorries | 180/69.1 |
| 1,444,310 | 2/1923 | Fishburn | 180/69.1 |

FOREIGN PATENTS OR APPLICATIONS

| 646,385 | 11/1928 | France | 180/69.1 |

Primary Examiner—Robert J. Spar
Attorney—Charles M. Fryer et al.

[57] ABSTRACT

The front and rear frame sections of an articulated vehicle each comprise a frame attached to the top of an axle and differential housing. A multi-part guard assembly is removably attached to each frame and housing to protect drive train and related components.

4 Claims, 7 Drawing Figures

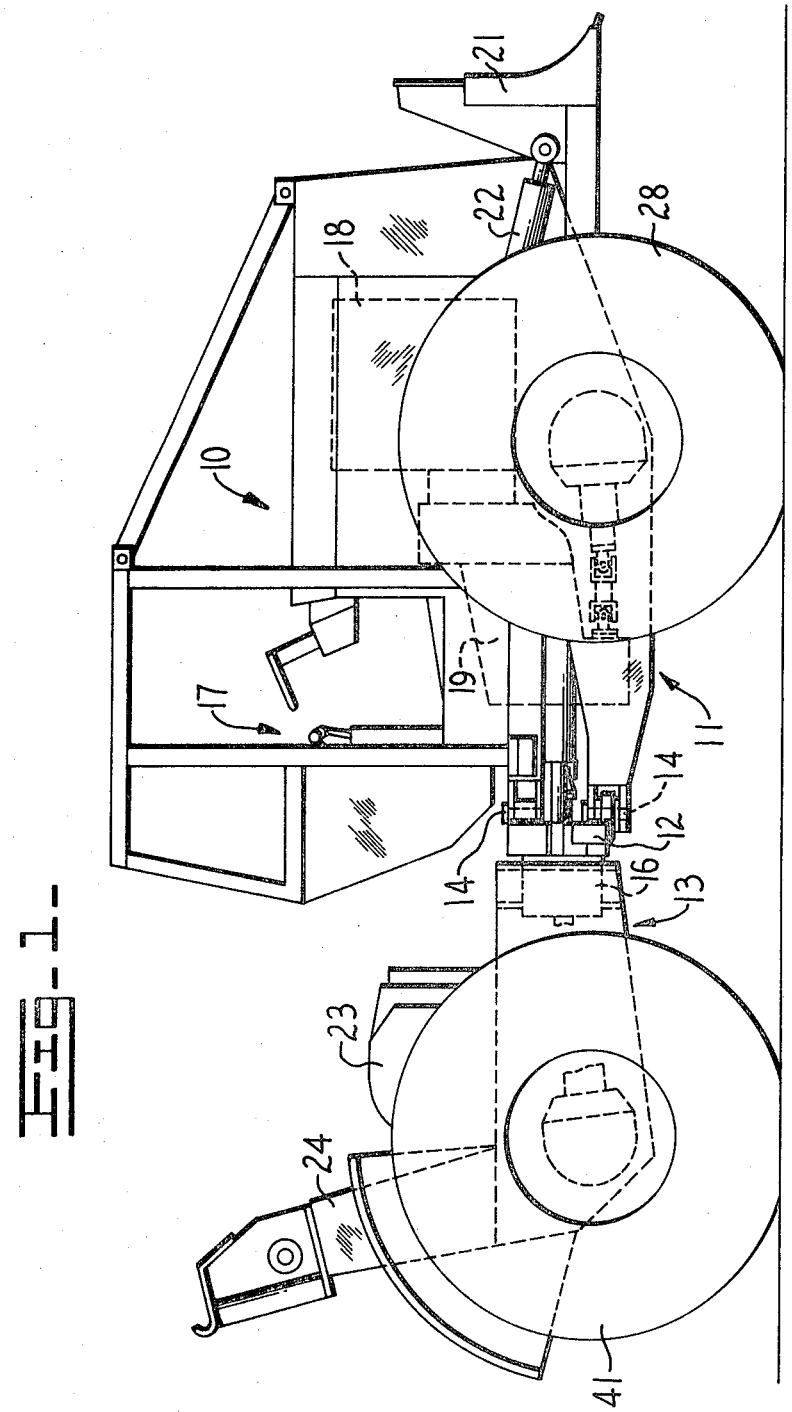

Patented Aug. 28, 1973
3,754,615
4 Sheets-Sheet 2
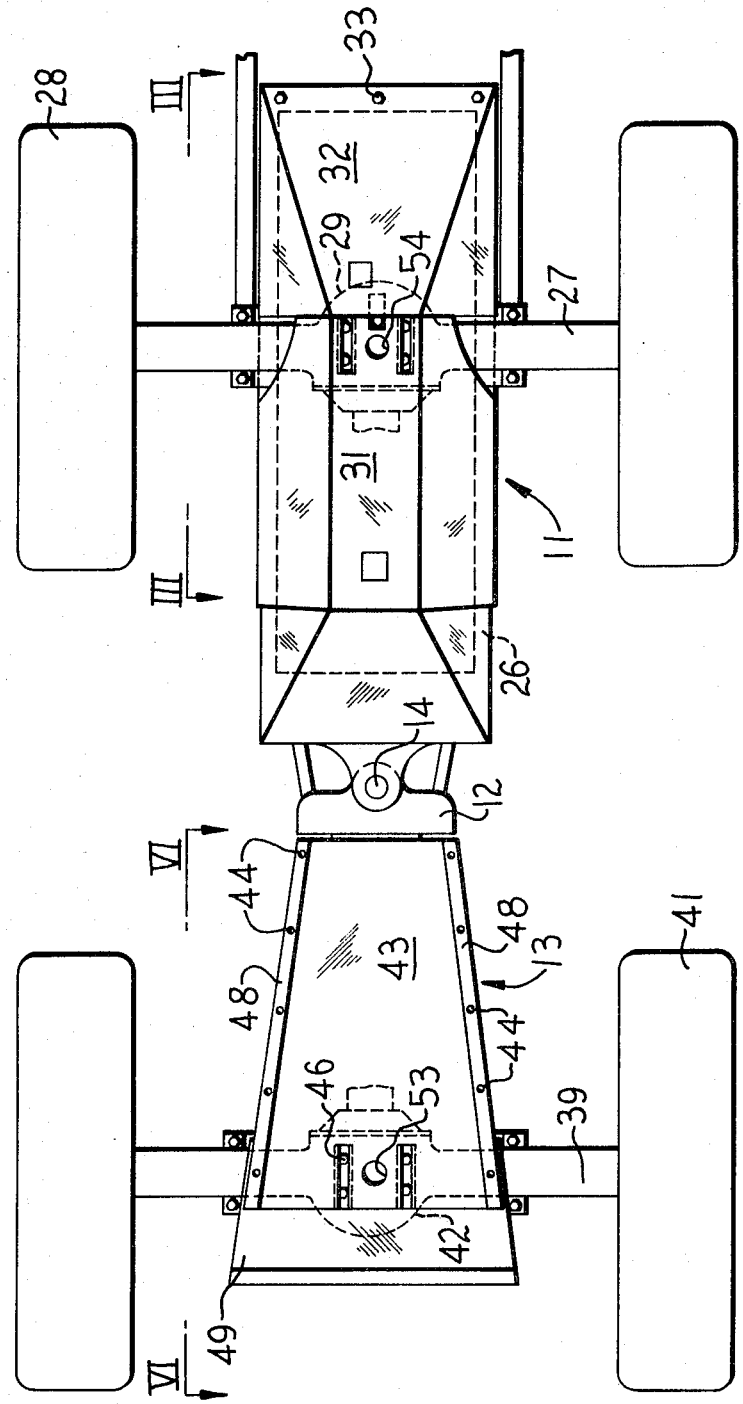
INVENTORS
ROBERT G. McINDOO
PETER SIDLES, JR.
BY
ATTORNEYS

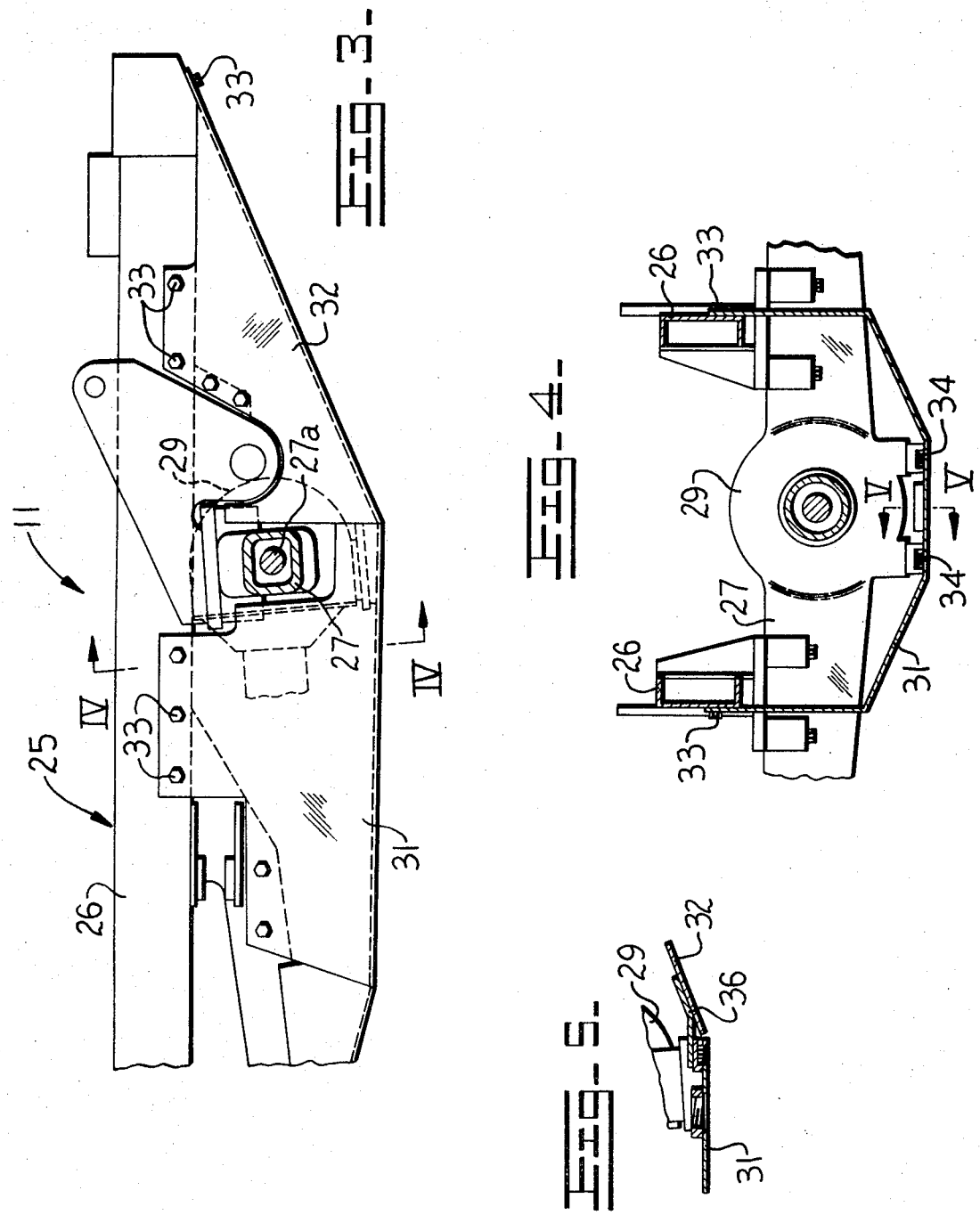

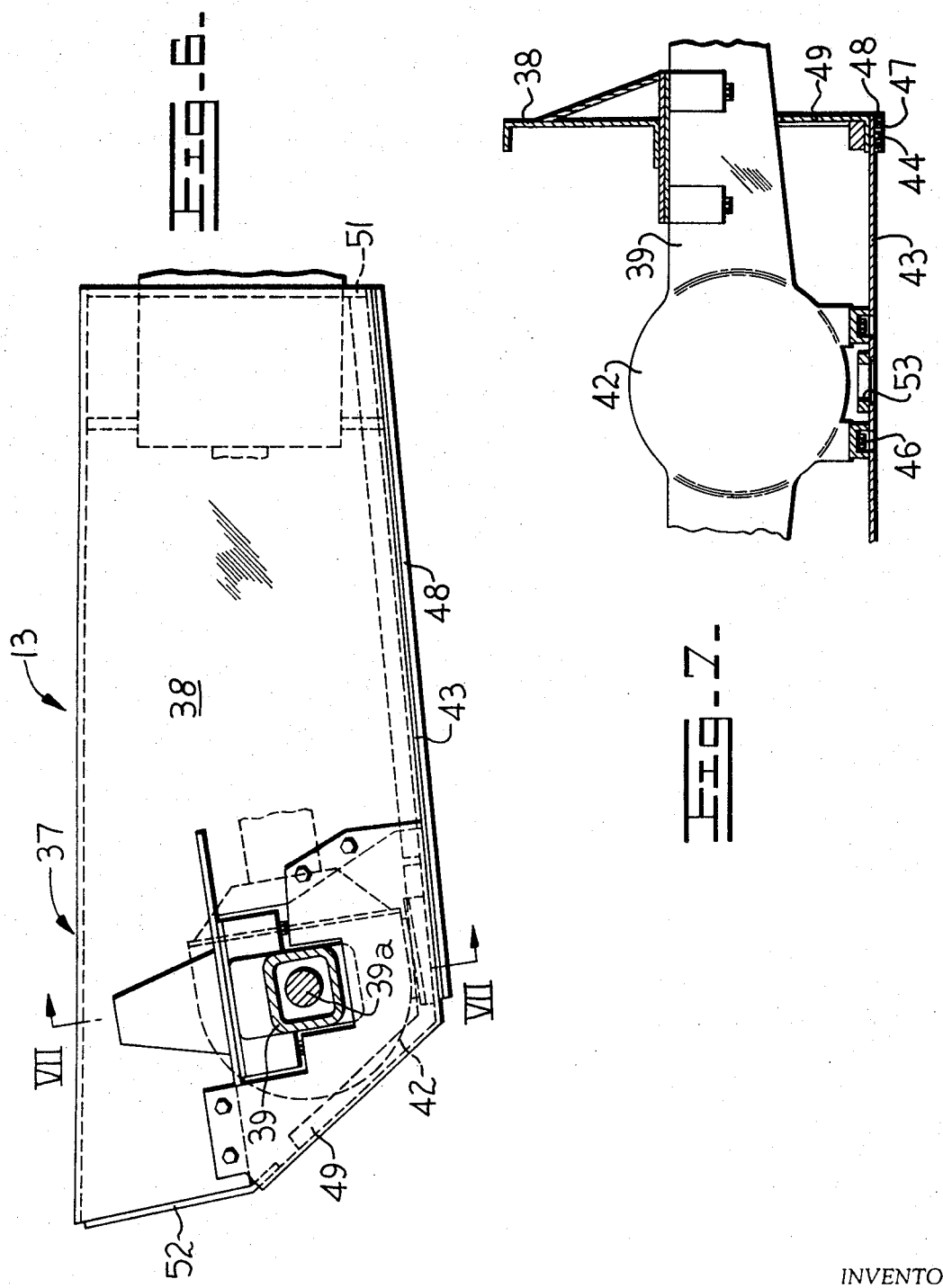

VEHICLE FRAME STRUCTURE

BACKGROUND OF THE INVENTION

This invention relates to the undercarriage of an articulated vehicle and more particularly to a guard assembly attached to each frame and axle housing of such vehicle to protect drive train and related components thereof.

A problem encountered during the operation of vehicles, such as log skidders, over rough terrain is one of protecting drive train and related components. For example, the vehicle's oil pan, transmission, drive shafts and related components are normally exposed to stumps, rocks, sticks and other debris. Such debris oftentimes damages such components upon impact therewith or tends to clog or otherwise impair the operation of working components of the vehicle.

In an effort to overcome such problem, attempts have been made to protect the components with steel plates, commonly called bellypans, attached to the bottom of the vehicle's support frame. The bulk and weight of bellypans normally preclude their use on rubber-tired vehicles, such as articulated log skidders. The log skidders must depend on their mobility and relative lightness to perform efficiently during a logging operation. The use of the above-described conventional bellypans thereon would tend to reduce such efficienty and add to the over-all cost of the log skidder.

SUMMARY AND OBJECTS OF THIS INVENTION

An object of this invention is to overcome the above, briefly described problem by providing a structurally integrated vehicle frame structure or undercarriage comprising longitudinally extending side frame members secured to the top of an axle housing and a lightweight guard assembly attached to both the frame members and the axle housing. The guard assembly is structurally integrated into the undercarriage to avail itself of the inherent structural rigidity and integrity afforded by the frame members and housing.

BRIEF DESCRIPTION OF THE DRAWINGS

Other objects of this invention will become apparent from the following description and accompanying drawings wherein:

FIG. 1 is a side elevational view of a vehicle embodying this invention,

FIG. 2 is a bottom plan view of the vehicle,

FIG. 3 is an enlarged side elevational view of a portion of a front frame section of the vehicle, taken in the direction of arrows III-III in FIG. 2, FIG. 4 is a sectional view, taken in the direction of arrows IV—IV in FIG. 3, FIG. 5 is a sectional view, taken in the direction of arrows V—V in FIG. 4, FIG. 6 is an enlarged, side elevational view of a portion of a rear frame section of the vehicle, taken in the direction of arrows VI—VI in FIG. 2, and FIG. 7 is a sectional view, taken in the direction of arrows VII—VII in FIG. 6.

DESCRIPTION OF THE PREFERRED EMBODIMENT

Referring to FIGS. 1 and 2, an articulated vehicle 10, such as a log skidder, comprises a front frame section 11 having a hitch member 12 secured thereto and a rear frame section 13. The hitch member is articulated to the front frame section by vertically disposed and aligned pivot pins 14 to facilitate steering of the vehicle in a conventional manner. The hitch member is attached to the rear frame section by a horizontally disposed pivot means 16 to allow the two frame sections to oscillate thereabout.

Front frame section 11 has an operator's station 17, an engine 18 and a transmission 19 mounted thereon. A bulldozer blade 21, adapted to be raised and lowered by hydraulic jacks 22, is mounted on the front end of the vehicle, as shown in FIG. 1. Rear frame section 13 has a winch 23 (not fully shown) and a logging arch 24 mounted thereon for logging operations.

Referring to FIGS. 3-5, the front frame section comprises a main frame 25 having a pair of longitudinally extending side channel members 26 formed integrally therewith. The main frame is attached to the top of an axle housing 27, which houses a drive axle 27a suitably attached to each drive wheel 28. A differential housing 29 is preferably formed as an integral part of the axle housing.

A front multi-part guard assembly comprises a rear guard 31 and a front guard 32 extending between and attached to laterally spaced side channel members 26, such as by bolts 33. The rear guard is further attached to the bottom of differential housing 29 by bolts 34 (FIG. 4). The front and rear guards are connected together by a centrally disposed tab 36 welded to the front guard and bolted to the rear guard (FIG. 5). Additional brackets and the like may be suitably integrated into the main frame to add further structural integrity thereto and to provide mounting means for other vehicle components.

Referring to FIGS. 1, 2, 6 and 7, rear frame section 13 comprises a main frame 37 having a pair of longitudinally extending and laterally spaced side channel members 38 (one shown in FIG. 7) formed integrally therewith. The main frame is secured to the top of an axle housing 39 which houses a drive axle 39a suitably connected to each rear drive wheel 41. A differential housing 42 is preferably formed integrally with the axle housing.

A rear multi-part guard assembly comprises a front guard 43 attached to the bottom of channel members 38 by bolts 44 and to the bottom of differential housing 42 by bolts 46 (FIG. 2). The heads of bolts 44 are preferably disposed in recesses 47, formed in strips 48 welded to front guard 43, to protect them from damage and wear (FIG. 7). A rear guard 49 extends between and is suitably attached to the sides of channel members 38 at the rear thereof.

The main frame 37 also includes a front plate 51 and a rear plate 52 extending between the channel members and welded thereto. An access opening 53 is formed through front guard 43 (FIG. 2) for servicing the differential in housing 42. A like access opening 54 may be formed through guard 31 (FIG. 2) for purposes of servicing differential 29.

What is claimed is:

1. A wheeled vehicle having a frame structure adapted to provide a protective housing and support for vehicle drive train components comprising a a front frame structure, a rear frame structure, means pivotally connecting the frames to one another, a pair of wheels, including axle housing supporting each of said frames, each frame structure having side members extending longitudinally of the vehicle with the axle housing extending transversely of the side members and attached to each of the side members, and a guard assembly removably attached to the side members and to the axle housing and substantially fully undercovering said frame structure, one of said structures having a guard assembly comprising two separable plates having one end of each joining one another in abutting relationship beneath the vehicle train with the free ends thereof removably secured to said side members, the other of said structures having a guard assembly comprised of a plate removably secured to said side member by bolt means extending through recessed openings provided substantially at the longitudinal ends thereof coinciding with openings in said side members whereby the bolt heads are protected from wear and damage, one of said plates of said one structure and the plate of the other structure being provided with spaced strip type recesses positioned beneath said axle housing, openings in said recesses corresponding with openings in said axle housings, bolt means extending through said openings for securing said one and said other plate to said axle housings respectively with the heads thereof disposed in the recesses for protecting them against wear and damage and an opening in each of said plates permitting access to said axle housings for servicing the same.

2. The vehicle of claim 1 wherein the access opening is disposed between the strip type recesses.

3. The vehicle of claim 1 wherein at least one of said plates is fabricated in one piece and are generally U-shaped in configuration.

4. The vehicle of claim 2 wherein said plates are fabricated in one piece and are generally U-shaped in configuration.

* * * * *